April 19, 1927.
R. RÜDENBERG ET AL
1,625,567
DEVICE FOR NEUTRALIZING THE HIGHER HARMONICS IN HIGH VOLTAGE LINE PLANTS
Filed May 6, 1922
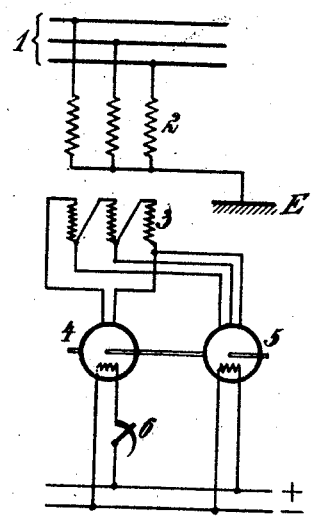
Inventors
Reinhold Rüdenberg and Karl Kurda
by Knight Bros
Attorneys Patented Apr. 19, 1927.

1,625,567

UNITED STATES PATENT OFFICE.

REINHOLD RÜDENBERG, OF BERLIN-CHARLOTTENBURG, AND KARL KURDA, OF NUREMBERG, GERMANY, ASSIGNORS TO SIEMENS-SCHUCKERTWERKE GESELLSCHAFT MIT BESCHRANKTER HAFTUNG, OF SIEMENSSTADT, NEAR BERLIN, GERMANY, A CORPORATION OF GERMANY.

DEVICE FOR NEUTRALIZING THE HIGHER HARMONICS IN HIGH-VOLTAGE-LINE PLANTS.

Application filed May 6, 1922, Serial No. 558,936, and in Germany September 10, 1921.

Three-phase lines of very high voltage are frequently provided with a grounded zero-point, for the purpose of avoiding, in case of accidental grounding of one phase, an essential increase of voltage in the other phases. Such grounding allows, however, a flowing to earth of the currents of triple frequency and of their harmonic oscillations produced in generators by a non-sinusoidal flux distribution curve and, especially, in transformers by the influence of the iron saturation. The triple periodic voltages have, as is known, equal phases in the windings of each three-phase system, so that they run all in parallel connection between the earth and the distant line and are capable of charging the latter with such a high triple periodic voltage that strong actions on adjacent small-current lines are produced which make the working of the latter impossible.

According to the present invention, electric line installations are provided with separate devices, which neutralize the higher harmonics in the lines by counter-electromotive forces of equal frequency, phase and value, which counter-act the higher harmonics. A higher harmonic field generator, which is synchronously driven from the line installation, serves as a voltage source for the higher harmonic waves, said voltage source being directly or indirectly inserted in the line installation at any part thereof, or in the working transformers respectively.

The accompanying diagrammatic illustration shows an alternating current distributing system embodying our invention.

1 are the high-voltage or power lines, 2 the high-voltage windings, and 3 the low-voltage windings of a transformer. In the delta-connected and open low-voltage side 3 of the transformer, the higher harmonic field generator 4 is inserted. It is driven from the synchronous motor 5, connected to the low-voltage side of the transformer 2—3. + and — designate continuous-current leads to the synchronous machines 4 and 5, while 6 is a rheostat for the generator 4. The generator directly imparts the counter-electromotive forces of triple frequency to the open delta-winding 3 of the transformer. The transformer 2—3 is provided, preferably, with a fourth empty core for the return flow of the lines of force. The value of the triple periodic voltage imparted to the low-voltage windings 3 of the transformer by the generator, may be adjusted by the rheostat 6, and its phase by regulating the phase between the stator voltages of the generator 4 and of the motor 5, for instance by relative angular displacement of the stators. The load capacity of the frequency converter 4—5 and also that of the transformer 2—3 need be adapted only to the wattage of the triple periodic harmonic oscillations in the network. The machinery becomes thus comparatively small.

In the transformer winding 2 a triple periodic higher harmonic voltage is produced which is equal but opposite to the voltage of triple frequency produced in the generator supplying the line system. Thus the opposing potentials neutralize each other in the winding 2 so that the latter acts as a short circuit for the triple periodic higher harmonic waves through which an equalizing current of triple frequency may pass to ground.

The transformer 2—3 separately excited as described, "absorbs", as it were, the triple periodic higher harmonic waves in the network and conducts them to earth E through the high-voltage windings 2. Such devices should, therefore, be arranged in proximity of such points in the line where the triple periodic voltages are produced, e. g. in proximity of generators and saturated transformers. The higher harmonic waves flow then within a limited range only and cannot exert any detrimental distant effects. By means of the rheostat 6 it is possible to exactly regulate the triple periodic counter electromotive force in accordance with the higher harmonics in the line.

Of course, the voltage source for the higher harmonic waves can be directly or indirectly connected to the lines of the line system at any part thereof, and it may also be inserted in the ground line, either of a choking coil branched-off from the line system, or of transformer windings of a working transformer which are connected to the line system. The voltage and phase of the voltage source for the higher harmonic waves need not be adjusted by hand in dependency of the actual working conditions of the system, but their adjustment may be effected automatically.

What we claim, is:—

1. In combination with a high-voltage supply line system, means for absorbing the higher harmonics generated therein, comprising a higher harmonic field generator suitably connected into said line system and means for synchronously driving said generator from said line system to produce higher harmonic electromotive forces of a frequency, phase and value equal to similar forces generated in the line system.

2. In combination with a high-voltage supply line system, means for absorbing the higher harmonics generated therein, comprising a transformer, having a star-connected primary winding connected with the high-voltage lines and an open delta-connected secondary winding, a higher harmonic field generator connected with said secondary winding, and means for driving said generator synchronously from said supply line, for producing higher harmonic electromotive forces of a frequency, phase and value equal to similar forces generated in the line system.

In testimony whereof we affix our signatures.

REINHOLD RÜDENBERG.
KARL KURDA.